(12) United States Patent
Clark

(10) Patent No.: US 12,117,524 B1
(45) Date of Patent: Oct. 15, 2024

(54) METHOD TO LOCALIZE AN UNDERWATER OBJECT

(71) Applicant: The United States of America as represented by the Secretary of the Navy, Newport, RI (US)

(72) Inventor: Cathy A Clark, Little Compton, RI (US)

(73) Assignee: The United States of America as represented by the Secretary of the Navy

( * ) Notice: Subject to any disclaimer, the term of this patent is extended or adjusted under 35 U.S.C. 154(b) by 307 days.

(21) Appl. No.: 17/671,704

(22) Filed: Feb. 15, 2022

(51) Int. Cl.
*G01S 15/06* (2006.01)
*G01S 7/539* (2006.01)
*G01S 15/89* (2006.01)

(52) U.S. Cl.
CPC .......... *G01S 15/8925* (2013.01); *G01S 7/539* (2013.01); *G01S 15/8995* (2013.01)

(58) Field of Classification Search
USPC .......................................................... 73/626
See application file for complete search history.

(56) References Cited

U.S. PATENT DOCUMENTS

| | | | | |
|---|---|---|---|---|
| 4,213,195 A | * | 7/1980 | Pridham | G01S 15/74 367/105 |
| 5,216,640 A | * | 6/1993 | Donald | G01S 3/8083 367/901 |
| 7,800,978 B2 | * | 9/2010 | Bernecky | G01S 3/8006 367/118 |
| 2006/0221328 A1 | * | 10/2006 | Rouly | G01C 3/08 356/3.01 |
| 2022/0268926 A1 | * | 8/2022 | Hooper | G01S 15/89 |
| 2022/0268927 A1 | * | 8/2022 | Hooper | G01S 15/87 |

FOREIGN PATENT DOCUMENTS

EP 2836852 B1 * 7/2020 ............ G01B 21/00

* cited by examiner

*Primary Examiner* — Clayton E. LaBalle
*Assistant Examiner* — Warren K Fenwick
(74) *Attorney, Agent, or Firm* — James M. Kasischke; Michael P. Stanley; Jeffry C. Severson

(57) ABSTRACT

A method for locating an underwater acoustic source includes using first and second linear arrays to receive signals. These signals can be resolved into intersecting cones and a contour of possible source locations can be estimated. In further embodiments, a third sonar array can receive a bearing and a depression/elevation from a signal. This information can be used with the contour to estimate a source location.

15 Claims, 2 Drawing Sheets

METHOD TO LOCALIZE AN UNDERWATER OBJECT

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The invention relates to a system and a corresponding method for detecting a location of an underwater object using sound navigation and ranging (SONAR) arrays.

(2) Description of the Related Art

A position of an underwater source is detectable by using SONAR technology. A linear array of hydrophones is utilized to detect these sources. Because of the linear array geometry, an angle of signal arrival can be determined, but one does not know the range to the source or the position of the signal other than on the surface of a cone. Due to the conical shape of the coverage area of the SONAR signal, it is termed as the cone of coverage of the SONAR array.

A surface vessel and an underwater vessel may include SONAR arrays to determine position of objects of interest within the water in close range. Each SONAR array may include a plurality of sensor elements or hydrophones. Time delays between signal arrivals at sensor elements along the array allow determination of an angle of arrival. However, there may remain ambiguity regarding exact location of the object with respect to the cone of coverage. By using a single SONAR element or a plurality of SONAR elements in an array, it may not be possible to localize an object within close range of the vessel.

SUMMARY OF INVENTION

A system and a corresponding method for localizing an underwater object is provided. Signals are received from a source at a first towed array and a second towed array. These towed arrays are positioned at different depths underwater. The estimated location of the source within a near field can be found based on overlapping cones of the received signals.

In further detail, a first array of SONAR elements and a second array of SONAR elements are towed by a vessel. The first and second towed arrays are vertically separated, with the first array located above the second array. Further, the first and second arrays are linearly separated along a direction of travel of the vessel. A third array is positioned on or near the vessel.

Acoustic emissions from an underwater object or source are detected by elements of the first towed array and the second towed array. Using beamforming, each of these arrays can resolve the position of the object to a cone of coverage having a conical angle. The object position can be further defined by the intersection of the first array coverage cone and the second array coverage cone. If the source is also detected by the SONAR elements of a third array, a bearing angle and a depression/elevation (DE) angle toward the source may be obtained from the third array. A unique point on the estimated contour of the intersection of the two cones that corresponds to the bearing angle and DE angle detected by the third array provides the location of the source.

By using signals detected at two vertically separated SONAR arrays, it is possible to localize to obtain range, depth, and bearing of an underwater object. By using two arrays instead of one along with a third array at the vessel, ambiguity regarding the exact location of the source is removed. The parallel towed arrays may be used during vessel navigation to locate any objects of interest in close proximity to the vessel.

BRIEF DESCRIPTION OF THE DRAWINGS

Features of illustrative embodiments may be understood from the accompanying drawings in conjunction with the description. The elements in the drawings may not be drawn to scale. Some elements and/or dimensions may be enlarged or minimized for the purpose of illustration and understanding of the disclosed embodiments wherein.

DETAILED DESCRIPTION OF THE INVENTION

Figure 1:
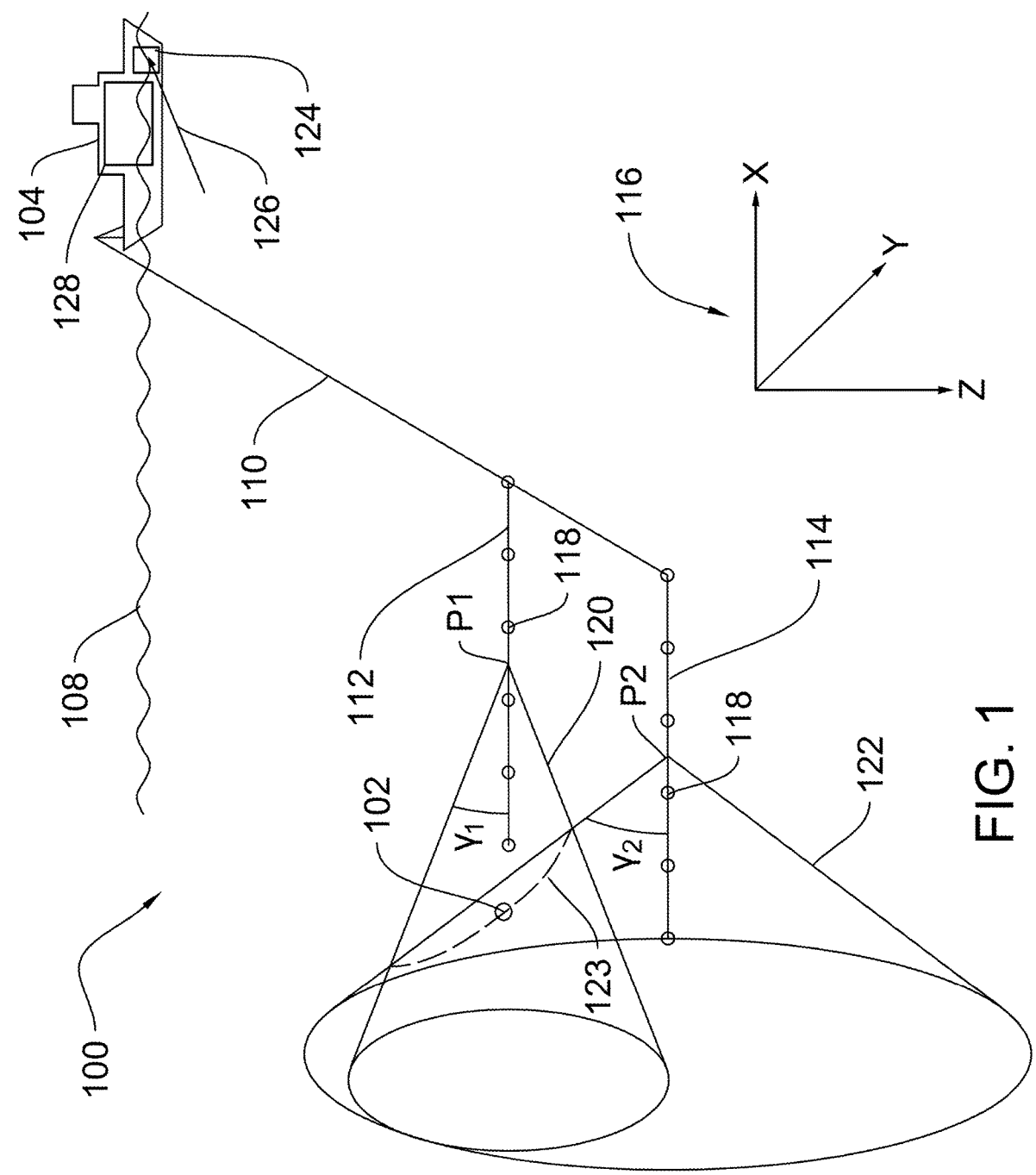
FIG. 1 is a view of two towed arrays used to estimate a position of an underwater object proximal to a vessel towing the arrays.
Figure 2:
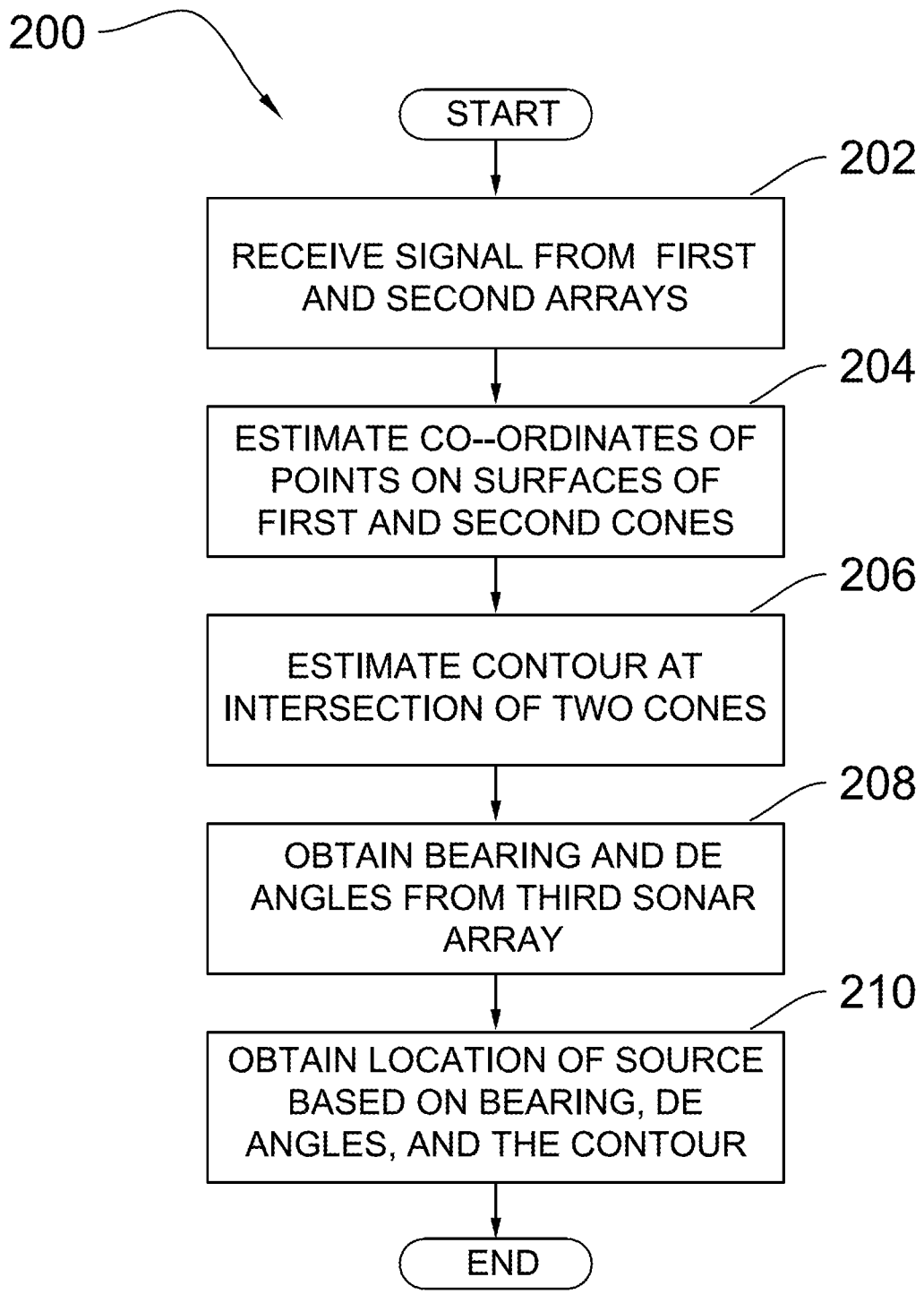
FIG. 2 shows an example flow-chart for estimation of the position of the underwater object based on signals received at the two towed arrays.

The following description relates to a system and corresponding method for detecting the location of an underwater source using two towed SONAR arrays. The system, including the SONAR arrays towed from a vessel, as used for detection of location of an underwater object proximal to the vessel, is shown in FIG. 1. An example method for detection of position of the underwater object based on signals detected by the towed SONAR arrays is shown in FIG. 2.

FIG. 1 depicts an example schematic of a setup 100 for detection of location of an underwater source 102 proximal to a vessel 104. The underwater object 102 is submerged in water 106 under the surface 108 of a water body such as an ocean. A first tow line 110 may be coupled to the vessel 104 to support a first array 112 and a second array 114. Each of the first array 112 and the second array 114 may be provided underwater in the same vertical plane with the vessel 104. As an example, the vertical plane shared by the first array 112, the second array 114, and the vessel 104 is the x-z axis of the coordinate system 116. The vessel travels forward in the direction of positive x-axis and the depth of water increases in the direction of the positive z-axis. A distance to port of starboard is along the y-axis.

Each of the first array 112 and the second array 114 includes a plurality of SONAR elements 118 configured with sensors for receiving acoustic signals from underwater objects. The elements 118 are linearly arranged along the arrays parallel to the x-axis. The first array 112 and the second array 114 may be parallel to each other with the second array 114 positioned vertically below the first array 112 with a distance (along the z axis) between the two arrays. Tow depth of the two arrays may be different (such as second array 114 having different buoyancy parameters than first array 112) to enable the two arrays to be vertically displaced with the second array 114 being at a greater depth (within water) relative to the first array 112. In this example, the two arrays are being towed by a vessel which may be a surface vessel. In alternate examples, the vessel may be a submarine with one array towed above the submarine (at a shallower depth relative to the submarine) and another array towed below the submarine (at a deeper depth relative to the submarine).

A first phase center of the first array 112, as shown by point P1, may be assumed to be an origin (0, 0, 0) of the coordinate system 116. A second phase center of the second array 114, as shown by point P2, may be shifted along the x-axis and the z-axis relative to P1. The coordinates for P2 are defined as ($\Delta r$, 0, $\Delta z$) with $\Delta r$ corresponding to the difference in range and the $\Delta z$ corresponding to the difference in depth relative to P1. A first cone 120 corresponding to the first array 112 and a second cone 122 corresponding to the second array 114 intersect in an ellipse 123. Source 102 will be located at a point on the ellipse 123. In this example, the range of the source is parallel to the x-axis, hence the dimension along the x-axis is represented by the variable r.

A third sonar array 124 is positioned at the vessel 104 and the third array 124 is able to detect a bearing angle and a depression/elevation angle to the source 102. Arrow 126 indicates this detection path.

The setup 100 further includes a controller 128. The controller 128 may be positioned at the vessel 104 or at a remote location communicatively connected to the vessel 104 through a wireless network. The controller 128 is configured as a conventional microcomputer including a microprocessor unit, input/output ports, read-only memory, random access memory, keep alive memory, a controller area network (CAN) bus, etc. The controller 128 receives input data from the various elements of the SONAR arrays, processes the input data, and estimates the position of an underwater object close by in response to the processed input data based on instruction or code programmed therein corresponding to one or more routines. A method for estimation of the position of the underwater object based on signals received at the two towed arrays is described in FIG. 2.

In this way, the system of FIG. 1 provides for a first array 112 of SONAR elements towed underwater by the vessel 104, a second array 114 of SONAR elements towed underwater by the vessel, the second array at a greater depth relative to the first array, a third SONAR array 124 at the vessel, and an underwater object 102 positioned at an intersection of a first cone 120 of coverage of the first array and a second cone 122 of coverage of the second array proximal to the vessel.

FIG. 2 shows a method 200 for estimation of a position of an underwater object (such as object 102 in FIG. 1) based on signals received at two arrays towed by a vessel (such as vessel 104 of FIG. 1) proximal to the source, in addition to a third array (such as third array 124 of FIG. 1) at the vessel. Method 200 will be described in reference to the systems described herein and with regard to FIG. 1, but it should be understood that similar methods may be applied to other systems without departing from the scope of this disclosure. Method 200 is carried out by a control system, and may be stored in non-transitory memory. Instructions for carrying out method 200 is executed by the control system in conjunction with signals received from SONAR arrays.

At 202, signals are received from each of a first SONAR array (such as first array 112 in FIG. 1) and a second SONAR array (such as second array 114 in FIG. 1). The vertically displaced arrays include a plurality of sensors to detect presence of sources proximal to the vessel. In the presence of such a proximal source, a first cone (such as first cone 120 in FIG. 1) corresponding to the first array and a second cone (such as second cone 122 in FIG. 1) corresponding to the second array intersect at the source. In further detail, the controller 128 resolves these cones as is known in the art by the delayed signal outputs of the sensors in the array.

At 204, coordinates of points on a surface of each of the first cone and the second cone are estimated. Points on a surface of the first cone are given by equation 1:

$$y^2+z^2=r^2 \tan^2\gamma_1 \quad (1)$$

where $\gamma_1$ is the opening angle of the first cone receiving signal from the source, and y, z, r are variables. Points on a surface of the second cone is given by equation 2:

$$y^2+(z-\Delta z)^2=(r-\Delta r)^2 \tan^2\gamma_2 \quad (2)$$

where $\gamma_2$ is the opening angle of the second cone 122 receiving a signal from the source, and y, z, r are variables.

Equations 1 and 2 can be solved for z to obtain equation 3 as a function of r for the intersection of the two cones, as follows:

$$z=f(r)=ar^2+br+c \quad (3)$$

where, $$a = \frac{\tan^2\gamma_1 - \tan^2\gamma_2}{2\Delta z}, b = \frac{\Delta r\tan^2\gamma_2}{\Delta z}, c = \frac{\Delta z^2 - \Delta r^2\tan^2\gamma_2}{2\Delta z}.$$

At 206, a contour is formed at the intersection of the first cone and the second cone. Using the equations 1-3, equation 4 is obtained for y as a function of r and z.

$$y = \pm\sqrt{r^2\tan^2\gamma_1 - z^2} \quad (4)$$

Equation 4 provides a set of points on a contour which is the intersection of the first cone and the second cone. The source is located on this contour. Based on the current system in use, such as the location of the boat, properties of the first, second, and third arrays, a range of boundary coordinates can be deduced for the contour. As an example, minimum and maximum values of range, depth, bearing angle, and depression/elevation angle are pre-calibrated and obtained from a control system memory.

At 208, a bearing angle and a depression/elevation angle of the source as detected by the third sonar array positioned at the vessel is obtained. In one example, $\beta_{shp}$ and $DE_{shp}$ represent the bearing and depression/elevation (DE) angle of the source as obtained from the third sonar array on the ship. The location of the phase center of the third sonar array in a coordinate system (such as coordinate system 116 of FIG. 1) is given by ($\Delta r_s$, 0, $\Delta z_s$). The $\beta_{shp}$ and $DE_{shp}$ obtained by the third sonar array provide a unique point on the contour which corresponds to the location of the source.

At 210, the location of the source is obtained by applying bearing and depression/elevation angles ($\beta_{shp}$ and $DE_{shp}$) from the third array to the contour.

A triangle is formed with the locations of the source, a projection of the source onto a horizontal plane, and a phase center of the third sonar array as apex points. The location of the phase center of the third sonar array is in a vertical plane that is rotated through the angle $\beta_{shp}$.

For the points on the contour, corresponding bearing and depression/elevation angles relative to the third array are given by equations 5 and 6.

$$\beta_{shp} = \tan^{-1} \frac{y}{r - \Delta r_s} \quad (5)$$

$$DE_{shp} = \tan^{-1} \frac{(z - \Delta z_s)\cos\beta}{r - \Delta r_s} \quad (6)$$

In this way, a set of possible source locations defined by range, depth, distance to port or starboard, bearing angle, and DE angle is obtained. To identify a unique solution within that set, the bearing angle and DE angle obtained from the third array is converted to a corresponding cone angle. The cone angle at the third sonar array is computed to each of the possible source locations on the contour. The cone angle ($\gamma_{shp}$) is given by equation 7.

$$\gamma_{sph} = \cos^{-1}(\cos\beta_{shp} \cdot \cos DE_{shp}) \quad (7)$$

The intersection of the cone angle with the contour provides the location of the source. The location of the source is defined by range, depth, bearing angle, and DE angle to the source.

In this way, a first signal is received on a first linear sonar array resolving to a first cone of signal source locations, the same signal is received on a second linear sonar array resolving to a second cone of signal source locations, the same signal is received at a third sonar array, and a location of the underwater source in a near-field is estimated based on the information received at the three arrays. By using two parallel towed arrays, in addition to a third array at the vessel, it is possible to determine the location of an underwater object in close proximity to a vessel.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for locating an acoustic source comprising:
providing a first linear array at a first depth in a plane;
providing a second linear array at a second depth in the same plane as the first linear array;
receiving signals from the acoustic source at each of the first linear array and the second linear array;
resolving signals received at the first linear array into a first cone of possible acoustic source locations;
resolving signals received at the second linear array into a second cone of possible acoustic source locations; and
estimating a contour of possible acoustic source locations at an intersection of the first and second cones of possible acoustic source locations.

2. The method in accordance with claim 1, wherein the contour of estimated possible acoustic source locations includes a set of ranges, depths, bearing angles, and depression/elevation (DE) angles from a known location to the acoustic source.

3. A method for locating an acoustic source comprising:
providing a first linear array at a first depth in a plane;
providing a second linear array at a second depth in the same plane as the first linear array;
receiving signals from the acoustic source at each of the first linear array and the second linear array;
resolving signals received at the first linear array into a first cone of possible acoustic source locations;
resolving signals received at the second linear array into a second cone of possible acoustic source locations;
estimating a contour of possible acoustic source locations at an intersection of the first and second cones of possible acoustic source locations wherein the estimated location of the acoustic source includes a set of ranges, depths, bearing angles, and depression/elevation (DE) angles from a known location to the acoustic source; and
towing the first linear array and the second linear array by a vessel in a tow direction in a near-field of the acoustic source wherein the known location is a location on the vessel.

4. The method in accordance with claim 3, wherein the first linear array has a first phase center and the second linear array has a second phase center such that the second linear array is offset from the first linear array along the tow direction of the vessel.

5. The method in accordance with claim 3, further comprising:
providing a third sonar array positioned on the vessel; and
obtaining a bearing angle and a depression/elevation angle from the acoustic source to the third sonar array.

6. The method in accordance with claim 5, further comprising estimating the location of the acoustic source as a function of the bearing angle and depression/elevation angle, and the contour of possible acoustic source locations.

7. A method for locating an acoustic source comprising:
providing a first linear array at a first depth in a plane;
providing a second linear array at a second depth in the same plane as the first linear array;
providing a third sonar array on a vessel;
receiving signals from the acoustic source at each of the first linear array, the second linear array, and the third sonar array;
resolving signals received at the first linear array into a first cone of possible acoustic source locations;
resolving signals received at the second linear array into a second cone of possible acoustic source locations;
estimating a contour of possible acoustic source locations at an intersection of the first and second cones of possible acoustic source locations;
obtaining a bearing angle and a depression/elevation angle from the acoustic source to the third sonar array; and
estimating a location of the acoustic source as a function of the third array bearing angle and depression/elevation angle, and the contour of possible acoustic source locations.

8. The method of claim 7, further comprising providing a controller wherein said steps of receiving signals, resolving signals received at the first linear array, resolving signals received at the second linear array, obtaining a bearing angle and a depression/elevation angle, and estimating the location are performed by the controller.

9. The method of claim 8, wherein the controller is positioned at the second vessel.

10. The method of claim 8, wherein the controller is positioned remotely from the second vessel.

11. A method for locating an acoustic source comprising:
providing a first linear array at a first depth in a plane;
providing a second linear array at a second depth in the same plane as the first linear array;
providing a third sonar array on a first vessel;
receiving signals from the acoustic source at each of the first linear array, the second linear array, and the third sonar array;
resolving signals received at the first linear array into a first cone of possible acoustic source locations;
resolving signals received at the second linear array into a second cone of possible acoustic source locations;
estimating a contour of possible acoustic source locations at an intersection of the first and second cones of possible acoustic source locations;
obtaining a bearing angle and a depression/elevation angle from the acoustic source to the third sonar array;
estimating a location of the acoustic source as a function of the third array bearing angle and depression/elevation angle, and the contour of possible acoustic source locations; and
towing the first linear array and the second linear array in a tow direction by a second vessel.

12. The method of claim 11, wherein the second vessel is a surface vessel.

13. The method of claim 11, wherein the second vessel is a submarine.

14. The method in accordance with claim 11, wherein the second linear array is at a deeper depth relative to the first linear array, the first linear array being parallel to the second linear array.

15. The method in accordance with claim 11, wherein the second vessel is the same vessel as the first vessel.

* * * * *